Patented Oct. 23, 1934

1,977,978

UNITED STATES PATENT OFFICE 1,977,978

CARRYING OUT CATALYTIC OXIDATIONS

Wilhelm Wenzel, Mannheim, Germany, assignor to I. G. Farbenindustrie Aktiengesellschaft, Frankfort-on-the-Main, Germany No Drawing. Application June 26, 1931, Serial No. 547,189. In Germany October 31, 1929

5 Claims. (Cl. 23—2)

The present invention relates to carrying out catalytic oxidations.

I have found that catalytic oxidations of compounds of carbon, as for example the oxidation of carbon monoxide, the oxidation of exhaust gases from Diesel motors, which are as a rule free from carbon monoxide, but which conntain considerable amounts of substances having a disagreeable odor, such as organic unsaturated acids, phenol-like bodies and the like, and a conversion of methane into formaldehyde are carried out in a manner, which is very advantageous by working in the presence of catalysts comprising manganites of metals the oxides of which do not exert an alkaline reaction when added to water, as for example of the heavy metals, the earth metals, such as aluminium or of the rare earth metals such as cerium or erbium or of magnesium or beryllium. As examples of the said manganites may be mentioned those of the metals of the iron group, i. e. iron, nickel or cobalt and other heavy metals such as copper, zinc or cadmium.

Contrasted with the catalysts already proposed for oxidations, which are prepared by a simple mechanical mixing of oxides, such as copper oxide, manganese dioxide or cobalt oxide, the catalysts according to the present invention, which are prepared by bringing the metals hereinbefore specified into chemical combination with manganese dioxide, have the considerable advantage that they are more stable for example to moisture, high temperatures and other injurious influences. Thus the copper manganite is less liable to poisoning by catalyst poisons than the mixture of these oxides, and is in fact practically immune. The new catalysts are therefore especially suitable for the removal of carbon monoxide from waste gases, for rendering the exhaust gases from combustion engines odorless and the like. The oxidation of carbon monoxide with the catalysts prepared according to this invention may begin already at ordinary temperatures. In account of the great heat evolved by this oxidation, the temperature is soon elevated and may rise to about 900° C.

Catalysts of different composition and activity can be prepared from the same initial materials according to the conditions employed during their preparation; for example it is known that manganites can be produced which contain two, four or even more atoms of manganese to each atom of the other metal combined therewith in the molecule. Manganites containing metals of a lower catalytic activity than copper are particularly suitable for the partial oxidation of organic compounds. In the preparation of the manganites, which is preferably carried out by wet methods, as for example by treating manganese dioxide with the corresponding metal salt solution or by precipitating the manganite from a solution containing a salt of a heavy metal or an earth metal and a salt of manganese with the simultaneous action of oxidizing substances such as potassium permanganate, hydrogen peroxide, oxygen and the like, more than one metal as for example cobalt together with copper may be combined with the manganese and in this manner catalysts having different activity are also obtained.

Combinations having different degrees of catalytic activity may also be obtained by only partially converting the manganese dioxide into manganites or by mixing different manganites with each other or with other catalytically active or inert substances. As mixtures of manganites with catalytically active substances may be mentioned copper manganite mixed with cobalt oxide or iron hydroxide or metals such as iron, zinc or aluminium.

A further advantage of the process according to the present invention is that the preparation of the manganites is much simpler than that of the said mixtures, since with the manganites precipitated from solutions only one washing operation is needed whereas the oxides used for the preparation of the mixtures are preferably washed separately.

By the process according to the present invention it is even possible to effect the oxidation of compounds of carbon contained in gases containing other compounds of reducing character, such as hydrogen. Said other compounds of reducing character are not oxidized in this manner or at the most to a negligible extent. It is possible in this way to employ the process also for the purification of the gases used for the synthesis of ammonia, which gases as a rule contain smaller or larger amounts of carbon monoxide as an impurity.

The following examples will further illustrate the nature of this invention but the invention is not restricted to these examples. The parts are by weight.

Example 1

A mixture of carbon monoxide and air containing 10 per cent of carbon monoxide is led at room temperature over a copper-cobalt manganite, which has been obtained by dissolving 12 grams of cobalt sulphate and 10 grams of copper sulphate in 100 cubic centimeters of a concentrated solution of potassium permanganate, adding at ordinary temperature to this solution a 5 per cent hydrogen peroxide solution until the violet coloration has disappeared, washing the precipitate formed until it is free from sulphate and drying the precipitate. The gas mixture leaving the catalyst is free from carbon monoxide even when the gas mixture is passed over the catalyst with a high velocity of flow, the carbon monoxide being converted into carbon dioxide.

Example 2

A gas mixture containing about from 80 to 90 per cent of air and 2 per cent of carbon monoxide and organic substances, such as benzine hydrocarbons, is led at 80° C. over a catalyst consisting of manganese dioxide, manganese manganite and copper manganite and the active constituent of which is copper manganite. The carbon monoxide is completely oxidized to carbon dioxide. The catalyst is prepared in the following manner. A concentrated solution of potassium permanganate is added while stirring to a solution of 600 grams of manganese nitrate in 2000 cubic centimeters of a 20 per cent nitric acid until the violet coloration is permanent. The precipitate formed is washed out until the washing water has only a slight acid reaction and then stirred for about 8 hours while warming to from 70° to 80° C. with 3000 cubic centimeters of a 10 per cent solution of copper sulphate. The precipitate is washed out until it is free from sulphate and then dried.

Example 3

A dilute sodium hydroxide is added drop by drop to a solution of 50 parts of manganese nitrate and 5 parts of copper sulphate in 1000 parts of water until this solution has a weakly alkaline reaction. At the same time a strong current of air is passed through the solution until after some hours the manganese hydroxide precipitated is converted into copper manganite. This latter is filtered off and dried.

When a mixture of air and carbon monoxide containing 5 per cent of carbon monoxide is passed at a temperature of about 60° C. over the copper manganite thus prepared, the carbon monoxide contained in the said mixture is completely oxidized.

Example 4

A vessel containing in its lower part a number of baffle plates, which force a gas passing therethrough to take a zig-zag path, is arranged in the exhaust of a Diesel motor. The said vessel is filled with 10 liters of a catalyst consisting of copper manganite of a suitable form. When exhaust gases are passed through the said vessel they are entirely freed from their disagreeable odor.

Example 5

A gas mask suitable for the removal of carbon monoxide from air is charged with particles of copper manganite of from about 3 to 4 millimeters in diameter. The catalyst is protected on both sides by a layer of silica gel arranged in the gas mask in the manner already known. Air containing 4 per cent of carbon monoxide is sucked through the catalyst with a velocity of flow of 1 cubic meter per hour. When leaving the catalyst the air is free from carbon monoxide. A gas mask provided with a charge of the said catalyst makes it possible to respire in an atmosphere containing about 2 per cent of carbon monoxide without any harmful effect.

Example 6

A mixture of methane and air containing about 16 per cent of methane is passed at temperatures above 550° C. over chromium manganite. Part of the methane is thereby converted into formaldehyde.

Example 7

Vapors of toluene are passed at from 280° to 500° C. together with air over a catalyst consisting of a mixture of iron manganite and uranium manganite. Part of the toluene employed is thereby converted into benzaldehyde, a smaller part being converted into benzoic acid.

Example 8

A mixture of carbon monoxide and air containing 8 per cent of carbon monoxide is passed at ordinary temperatures over a catalyst consisting of copper manganite. The carbon monoxide is thus completely oxidized. The catalyst is prepared in the following manner: 400 grams of finely pulverized pyrolusite is added to 5000 cubic centimeters of an aqueous solution of sulphurous acid. Sulphur dioxide is bubbled through while stirring until the solution becomes clear. The liquid is separated from the solid residue, and after being freed from the excess of sulphurous acid expelled by boiling, it is mixed with 20 cubic centimeters of concentrated nitric acid and 20 grams of ammonium nitrate. A concentrated solution of potassium permanganate is then added while stirring. The precipitate formed is washed by repeated decanting, then heated for several hours to from 70° to 80° C. together with 3000 cubic centimeters of a 10 per cent solution of copper sulphate, and then filtered, washed, kneaded, shaped and dried.

The stability of the catalysts prepared according to the present invention may be illustrated by the following comparative example:

A catalyst prepared in the above described manner which effects the complete oxidation of the carbon monoxide contained in a mixture thereof with air (10 per cent of carbon monoxide) was heated for several minutes to about 700° C. and then employed again for the oxidation of carbon monoxide. The activity of the catalyst was not impaired by any degree even when the heat treatment was repeated several times or carried out at 800° C. If, however, a mixture consisting of copper oxide and manganese dioxide was heated for several minutes to 650° C. under otherwise the same conditions it entirely lost its capacity for oxidizing carbon monoxide at ordinary temperature, which capacity before the heat-treatment corresponded to that of the catalyst prepared according to the present invention. In order to render the said mixture active it was to be heated to 240° C., but even then only about 20 per cent of the carbon monoxide were oxidized.

Example 9

A precipitate prepared as described in Example 2 is pressed after washing out, kneaded with 10 per cent of iron powder, again pressed and dried. 250 cubic centimeters of this mass is then introduced into an iron tube which is connected with the exhaust disposal of a Diesel motor. If the exhaust gases having a temperature of about 240° C. are passed over the catalyst with a velocity of flow of 12 liters per minute, the penetrating and disagreeable odor of the gases disappears.

Example 10

100 grams of manganese nitrate are dissolved in 200 cubic centimeters of 10 per cent nitric acid and then blended with a concentrated solution of potassium permanganate. The precipitate formed is washed and thereupon warmed on the water bath together with a solution of 102 grams of cerium nitrate in 100 cubic centimeters of water, which after becoming a considerable acidity is replaced by a fresh solution of like nature. The cerium manganite formed is then washed and dried. When 0.25 liter of air containing 0.5 gram of vaporized ethyl alcohol per liter is passed per hour at a temperature of from 300° to 360° C. over 20 cubic centimeters of the said cerium manganite a great part of the ethyl alcohol is converted into acetaldehyde.

Example 11

40 parts of naphthalene are ground together with 10 parts of copper manganite. The mixture is then heated on a water bath and melted and a slow current of oxygen is passed through the melt. After some hours the product is subjected to extraction with water. On cooling the aqueous extract phthalic acid crystallizes out in the form of fine needles.

Example 12

A concentrated solution of potassium permanganate is added, while stirring, to a concentrated solution of manganese nitrate containing 10 per cent of nitric acid until the violet coloration remains. The precipitate formed is then washed out by decanting until the washing liquid is colorless and then stirred for one hour with the double volume of a 10 per cent solution of copper nitrate. The precipitate is then allowed to deposit and is separated from the liquid and thereupon stirred with an equal amount of copper nitrate solution. After washing out the precipitate is kneaded with the double weight of iron powder.

A gas mixture employed for the synthesis of ammonia, which in addition to nitrogen contains 75 per cent of hydrogen, 1 per cent of carbon monoxide and 0.75 per cent of oxygen, is then passed at 100° C. over 5 grams of the catalyst thus obtained. 0.93 per cent of carbon monoxide and only 0.15 per cent of hydrogen are thus oxidized.

This application is a continuation-in-part of the application for Patent Serial No. 491,323, filed October 25th, 1930.

What I claim is:—

1. A process for the removal of carbon monoxide from the gases employed for the synthesis of ammonia which comprises contacting said gases in the presence of oxygen with a catalyst comprising a manganite of a metal the oxide of which does not exert an alkaline reaction when added to water.

2. A process for the removal of carbon monoxide from a gas containing carbon monoxide and another gas of reducing character which comprises contacting said gases in the presence of oxygen with a catalyst comprising a manganite of a metal, the oxide of which does not exert an alkaline reaction when added to water.

3. A process for the removal of carbon monoxide from the gases employed for the synthesis of ammonia which comprises contacting said gases in the presence of oxygen with a catalyst comprising a manganite of a heavy metal.

4. A process for the removal of carbon monoxide from the gases employed for the synthesis of ammonia which comprises contacting said gases in the presence of oxygen with a catalyst comprising a manganite of copper.

5. A process for the removal of carbon monoxide from the gases employed for the synthesis of ammonia which comprises contacting said gases in the presence of oxygen with a catalyst comprising a manganite of a metal of the iron group.

WILHELM WENZEL.